(12) United States Patent  (10) Patent No.: US 8,171,859 B2
Löser et al.  (45) Date of Patent: May 8, 2012

(54) MAGNETIC LEVITATION VEHICLE WITH AT LEAST ONE MAGNETIC SYSTEM

(75) Inventors: Friedrich Löser, Riemerling (DE); Qinghua Zheng, Taufkirchen (DE)

(73) Assignee: ThyssenKrupp Transrapid GmbH, Kassel (DE)

( * ) Notice: Subject to any disclaimer, the term of this patent is extended or adjusted under 35 U.S.C. 154(b) by 201 days.

(21) Appl. No.: 12/513,795

(22) PCT Filed: Oct. 12, 2007

(86) PCT No.: PCT/DE2007/001812
§ 371 (c)(1),
(2), (4) Date: May 6, 2009

(87) PCT Pub. No.: WO2008/064622
PCT Pub. Date: Jun. 5, 2008

(65) Prior Publication Data
US 2010/0031846 A1  Feb. 11, 2010

(30) Foreign Application Priority Data
Nov. 27, 2006 (DE) .......................... 10 2006 056 335

(51) Int. Cl.
*B60L 13/04* (2006.01)
(52) U.S. Cl. .......................... 104/281; 104/282; 104/284
(58) Field of Classification Search ........... 104/281–284
See application file for complete search history.

(56) References Cited

U.S. PATENT DOCUMENTS

| | | | |
|---|---|---|---|
| 4,979,445 A | 12/1990 | Lanzara | |
| 5,388,527 A * | 2/1995 | Thornton | 104/284 |
| 6,357,359 B1 * | 3/2002 | Davey et al. | 104/282 |
| 6,411,049 B1 * | 6/2002 | Fischperer | 318/38 |
| 6,827,022 B2 * | 12/2004 | van den Bergh et al. | 104/284 |
| 7,432,791 B2 * | 10/2008 | Hahn et al. | 335/296 |
| 7,533,616 B2 * | 5/2009 | Hahn et al. | 104/284 |
| 7,637,214 B2 * | 12/2009 | Beck et al. | 104/284 |
| 7,724,120 B2 * | 5/2010 | Hahn et al. | 336/234 |
| 7,814,840 B2 * | 10/2010 | Becker et al. | 104/281 |
| 7,855,628 B2 * | 12/2010 | Hahn et al. | 336/206 |
| 2002/0178965 A1 * | 12/2002 | Davey | 104/281 |
| 2004/0123766 A1 * | 7/2004 | van den Bergh et al. | 104/281 |
| 2005/0061195 A1 * | 3/2005 | Lutz et al. | 104/290 |
| 2006/0096495 A1 * | 5/2006 | Fischperer | 104/281 |
| 2007/0169661 A1 * | 7/2007 | Hahn et al. | 104/281 |
| 2008/0143467 A1 * | 6/2008 | Hahn et al. | 336/185 |
| 2008/0236973 A1 * | 10/2008 | Hahn et al. | 191/10 |
| 2008/0257197 A1 * | 10/2008 | Hahn et al. | 104/282 |
| 2009/0021335 A1 * | 1/2009 | Hahn et al. | 335/297 |
| 2009/0174511 A1 * | 7/2009 | Hahn et al. | 335/296 |
| 2010/0031846 A1 * | 2/2010 | Loser et al. | 104/281 |

FOREIGN PATENT DOCUMENTS

| | | |
|---|---|---|
| DE | 23 43 884 | 3/1975 |
| DE | 39 17 058 C1 | 11/1990 |
| DE | 102004013994 | 10/2005 |
| DE | 102004056438 | 10/2005 |

* cited by examiner

*Primary Examiner* — S. Joseph Morano
*Assistant Examiner* — Jason C Smith
(74) *Attorney, Agent, or Firm* — McGlew and Tuttle, P.C.

(57) ABSTRACT

A magnetic levitation vehicle has at least one magnetic arrangement (27). The magnetic arrangement (27) contains a plurality of magnetic poles (27a . . . 27n) which are arranged one behind the other in the direction of travel and comprise windings (33) associated therewith. The magnetic levitation vehicle is also provided with a circuit for supplying the windings (33) with a direct current, said circuit containing switches for selectively switching the magnetic arrangement between a guiding function and/or a braking function.

20 Claims, 7 Drawing Sheets

MAGNETIC LEVITATION VEHICLE WITH AT LEAST ONE MAGNETIC SYSTEM

CROSS REFERENCE TO RELATED APPLICATIONS

This application is a United States National Phase application of International Application PCT/DE2007/001812 and claims the benefit of priority under 35 U.S.C. §119 of German Patent Application DE 10 2006 056 335.2 filed Nov. 27, 2006, the entire contents of which are incorporated herein by reference.

FIELD OF THE INVENTION

The present invention pertains to a magnetic levitation vehicle with at least one magnet array, which has a plurality of magnet poles arranged one after another in a direction of travel with windings associated with same, and with a switching arrangement connected to the windings for supplying said windings with direct current.

BACKGROUND OF THE INVENTION

Magnetic levitation trains with vehicles of this type are driven, for example, by long-stator linear motors and have three-phase a.c. windings, which are intended to drive the vehicles and are installed along the track in a long stator. The energizing field of the linear motors is generated by carrier magnets, which act as exciting magnets at the same time, are arranged in the vehicle and form a first magnet array (e.g., DE 39 17 058 C2). The linear motors may be used not only to drive but also to brake the vehicles.

The magnetic levitation vehicles of the class described in the introduction preferably also have, on both sides, a second magnet array each, which is used for the "guiding" function and has a plurality of magnet poles arranged one after another in the direction of travel and windings associated with said magnet poles (e.g., DE 10 2004 056 438 A1). These are operated with current such that all the magnet poles that are located in a row or plane parallel to the direction of travel have the same polarity. In addition, these magnet arrays are controlled by means of control circuits and associated gap sensors such that gaps, hereinafter called guide gaps, are always maintained at equal values between the magnet poles and ferromagnetic lateral guide rails arranged on both sides at the track.

Since there is no possibility of braking any longer, e.g., in case of failure of individual or all carrier and exciting magnets or of the drive system, magnetic levitation vehicles intended for high velocities are additionally equipped with a so-called "safe" brake, which preferably comprises an eddy current brake (DE 10 2004 013 994 A1). Such an eddy current brake is formed from a third magnet array, which is arranged between the magnet arrays for the "guiding" function. This third magnet array cooperates with an electrically conductive reaction rail, preferably with the lateral guide rail, and has a plurality of magnet poles, which are arranged one after another in the direction of travel and are operated, contrary to the guiding magnet array, with different polarities, preferably alternatingly with north and south poles. Eddy currents, which brake the magnetic levitation vehicle more or less strongly as a function of the velocity of the magnetic levitation vehicle and the value of the direct current that is sent through the windings of the braking magnet array, are generated hereby in the reaction rail in case of braking.

Two problems arise, in particular, based on the described construction of usual magnetic levitation vehicles. On the one hand, the design effort associated with the three different magnet arrays is undesirably great and cost-intensive. On the other hand, the alternating arrangement of guiding and braking magnet arrays one after another along the lateral guide rails leads to a large number of load alternations, so that the forces will be introduced nonuniformly, which must be compensated by correspondingly stronger vehicle and track constructions.

SUMMARY OF THE INVENTION

Based on this, the technical object of the present invention is to design the magnetic levitation vehicle of the type described in the introduction such that simpler and hence more cost-effective design of the magnet arrays is possible and more uniform introduction of forces is achieved in the "guiding" and "braking" functions.

According to the invention, a magnetic levitation vehicle is provided comprising at least one magnet array with a plurality of magnet poles arranged one after another in a direction of travel with windings associated with the poles. A switching arrangement is connected to the windings for supplying the windings with direct current. The switching arrangement contains switches connected to the windings for setting the magnet array to a guiding function and/or a braking function as desired.

The magnetic levitation vehicle according to the present invention is characterized in that the "guiding" and "braking" functions are carried out by means of one and the same magnet array. As a result, it is possible not only to reduce the number of magnet arrays hitherto necessary from three to two, but also to achieve a more uniform distribution of forces along the entire track. In addition, an increase in redundancy is achieved because more magnet poles are available for the "guiding" and "braking" functions than before.

The present invention will be explained in more detail below in connection with the attached drawings on the basis of an exemplary embodiment that is currently considered to be the best. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
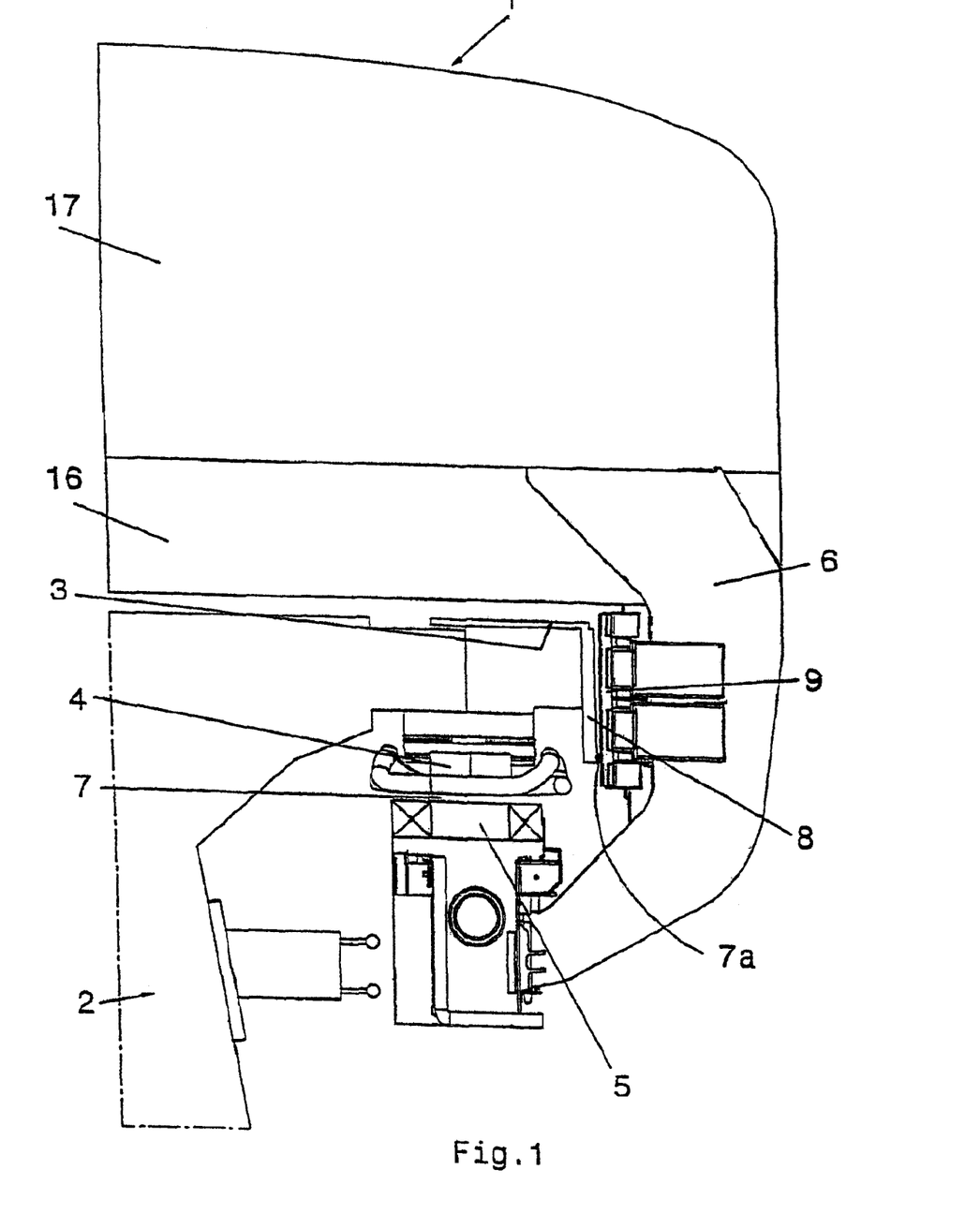
FIG. 1 is a schematic partial sectional view through a usual magnetic levitation vehicle.

Referring to the drawings in particular, FIG. 1 schematically shows a cross section through a magnetic levitation vehicle 1, which is mounted on a track in the usual manner in such a way that it is able to travel, said track comprising a carrier 2 made of steel and/or concrete and track plates 3 mounted thereon. The magnetic levitation vehicle 1 is driven by means of a long-stator motor, which has stator packages 4, which are fastened below the track plates 3 and follow each other in the longitudinal direction. The stator packages 4 have teeth and grooves, which alternatingly follow each other, are not shown and into which windings are inserted, which are supplied with three-phase current of variable amplitude and frequency. The energizing field of the long-stator motor is generated by at least one carrier magnet 5, which is fastened to the magnetic levitation vehicle 1 with at least one lateral frame strap 6 and has magnet poles facing downwardly open grooves of the stator package 4 in FIG. 1. Not only does the carrier magnet 5 provide the energizing field, but it also assumes the function of carrying and levitation by maintaining a preset gap 7 of, e.g., 10 mm between the carrier magnet 5 and the stator packages 4 during the operation of the magnetic levitation vehicle 1.

For tracking the magnetic levitation vehicle 1, the track plates 3 have laterally arranged reaction and lateral guide rails 8, opposite which guide magnets 9 are arranged, which are likewise mounted at the frame strap 6 and which are used during the operation, to maintain a gap 7 corresponding to gap 7a between them and the reaction rail 8. The carrier magnet 5 shown in FIG. 1 and the guide magnet 9 have a magnet array each fastened to the frame strap 6 for the "carrying" and "guiding" functions. However, it is clear that, as a rule, a plurality of such magnet arrays may be arranged at the magnetic levitation vehicle 1 laterally next to each other and one after another in the direction of travel. Each magnet array is preferably connected to a magnetic back box, with which it is fastened to the frame straps 6, which are in turn connected to a flexurally rigid lower or levitation frame 16 having longitudinal and cross connectors, on which a body 17 of the magnetic levitation vehicle 1, which said car body is provided with a passenger compartment (FIG. 1), is supported.

Figure 2:
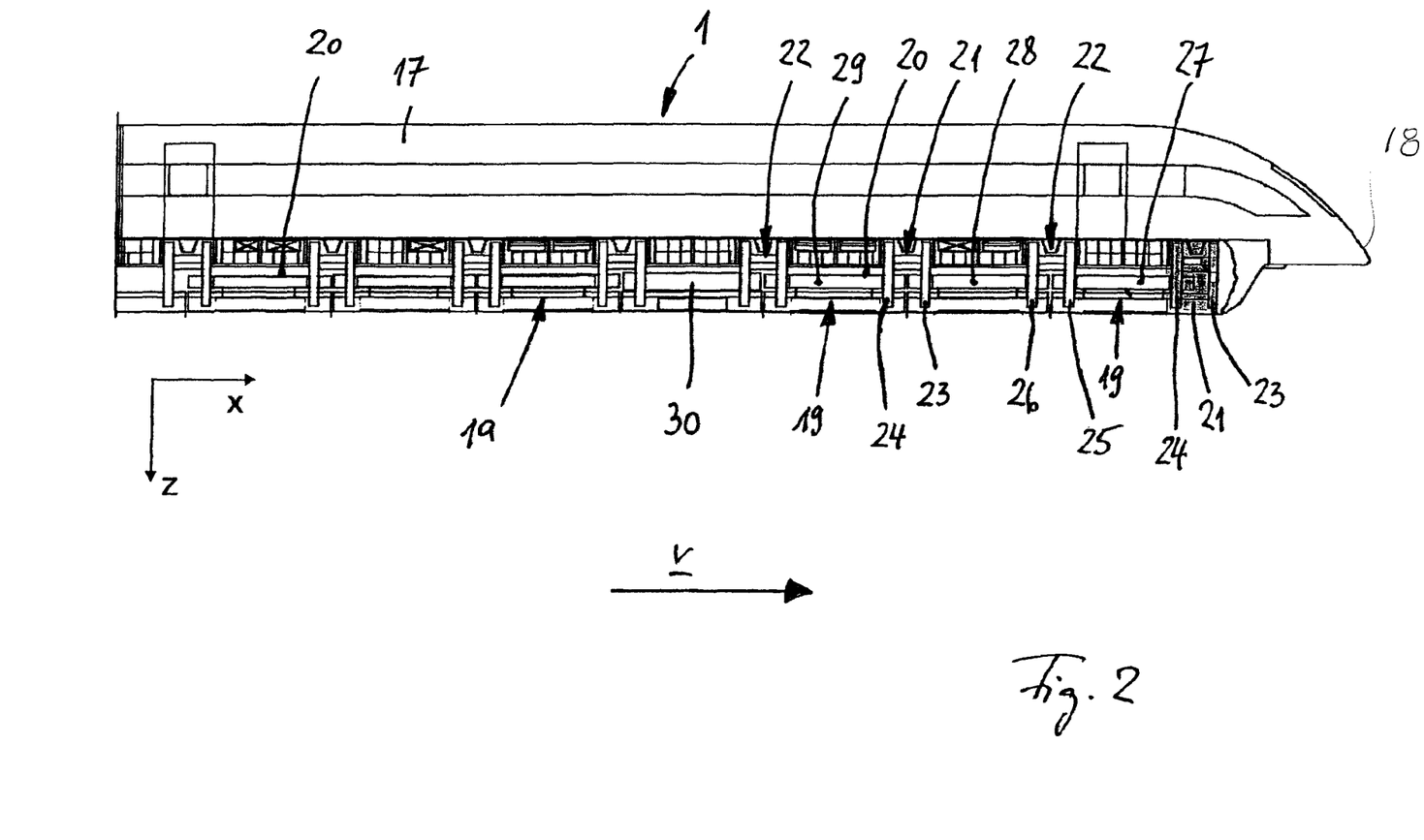
FIG. 2 is a schematic side view of a part of the magnetic levitation vehicle designed with a prior-art guiding and braking magnet array according to FIG. 1.

For example, the arrangement shown in FIG. 2 is obtained for a practical exemplary embodiment of the magnetic levitation vehicle 1 according to FIG. 1. The direction of travel of the magnetic levitation vehicle 1 is indicated by an arrow v and its front end is designated by reference number 18. Furthermore, a highly schematic view shows some levitation frame sections 19 of the levitation frame 16 (FIG. 1), which are arranged one after another in the longitudinal direction of the vehicle 1 and are coupled to the body 17 of the magnetic levitation vehicle 1 via pneumatic springs, not shown. The levitation frame sections 19 have support elements 21, 22 in the form of frame parts, which are located at spaced locations from one another in the longitudinal direction and are connected by longitudinal beams, and which are provided with a front and rear support part 23, 24 as well as 25, 26 each. A guide magnet array 27 that is the frontmost guide magnet array in the direction of travel is connected in the exemplary embodiment to a frontmost levitation frame section 19 such that its front end at the rear support part 24 of the front support element 21 and its rear end are connected to the front support part 25 of the rear support element 22, as is clearly shown in FIG. 2. A next guide magnet array 28 is normally connected to the rear support part 26 of the rear support element 22 of the frontmost levitation frame section 19 at its front end and to the front support part 23 of the front support element 21 of the levitation frame section 19 that follows in the direction of travel at its rear end, in both cases in an articulated manner. A third guide magnet array 29 is connected to the second levitation frame section 19 analogously to the first guide magnet array 27. A braking magnet array 30, which forms a zone free from guide magnets and is likewise an eddy current brake interacting with the lateral guide rail 8, is installed after the third guide magnet array 29 along a section that corresponds to the length of a guide magnet. The braking magnet array 30 is connected to two levitation frame sections 19 following each other in an articulated manner in the same manner as this applies to the second guide magnet 28. The braking magnets 30 are joined in the direction of travel by additional guide magnet arrays corresponding, e.g., to the guide magnet arrays 27 through 29 and by additional braking magnet arrays corresponding to the braking magnet arrays 30, until the end of the vehicle 1 is reached. In addition, it is clear that only one side of the magnetic levitation vehicle 1, which corresponds to the right side in the direction of travel, is shown in FIG. 2 and corresponding guide magnets and optionally additional braking magnets may be present on the left side not visible in FIG. 2. As an alternative, the vehicle part shown in FIG. 2 may, however, also be a single section of a magnetic levitation vehicle comprising a plurality of sections coupled with one another.

Figures 3, 4, 5:
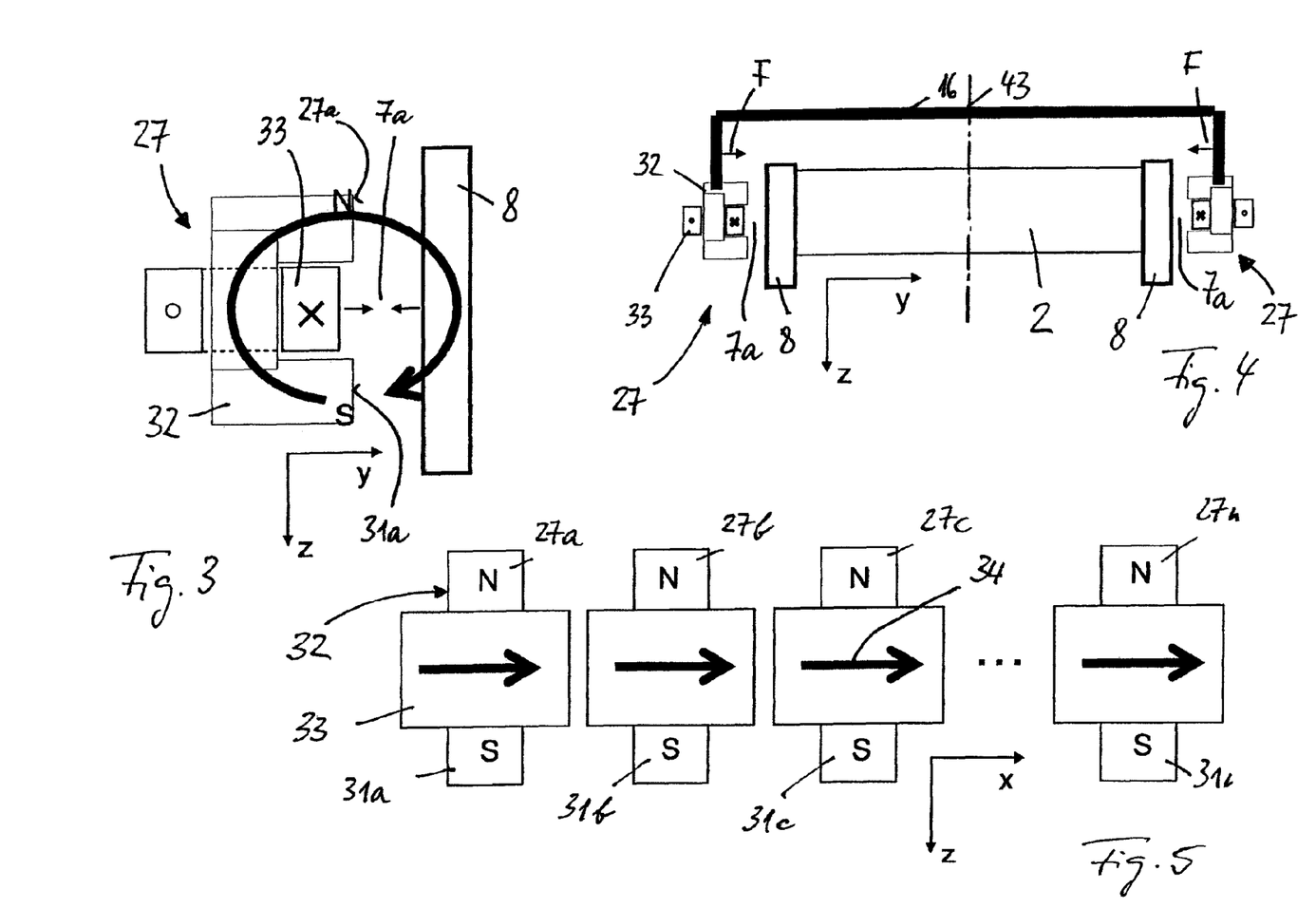
FIG. 3 is a schematic view showing the design of a prior-art guiding magnet array in one of different views.
FIG. 4 is a schematic view showing the design of a prior-art guiding magnet array in another of different views.
FIG. 5 is a schematic view showing the design of a prior-art guiding magnet array in another of different views.
Figures 6, 7, 8:
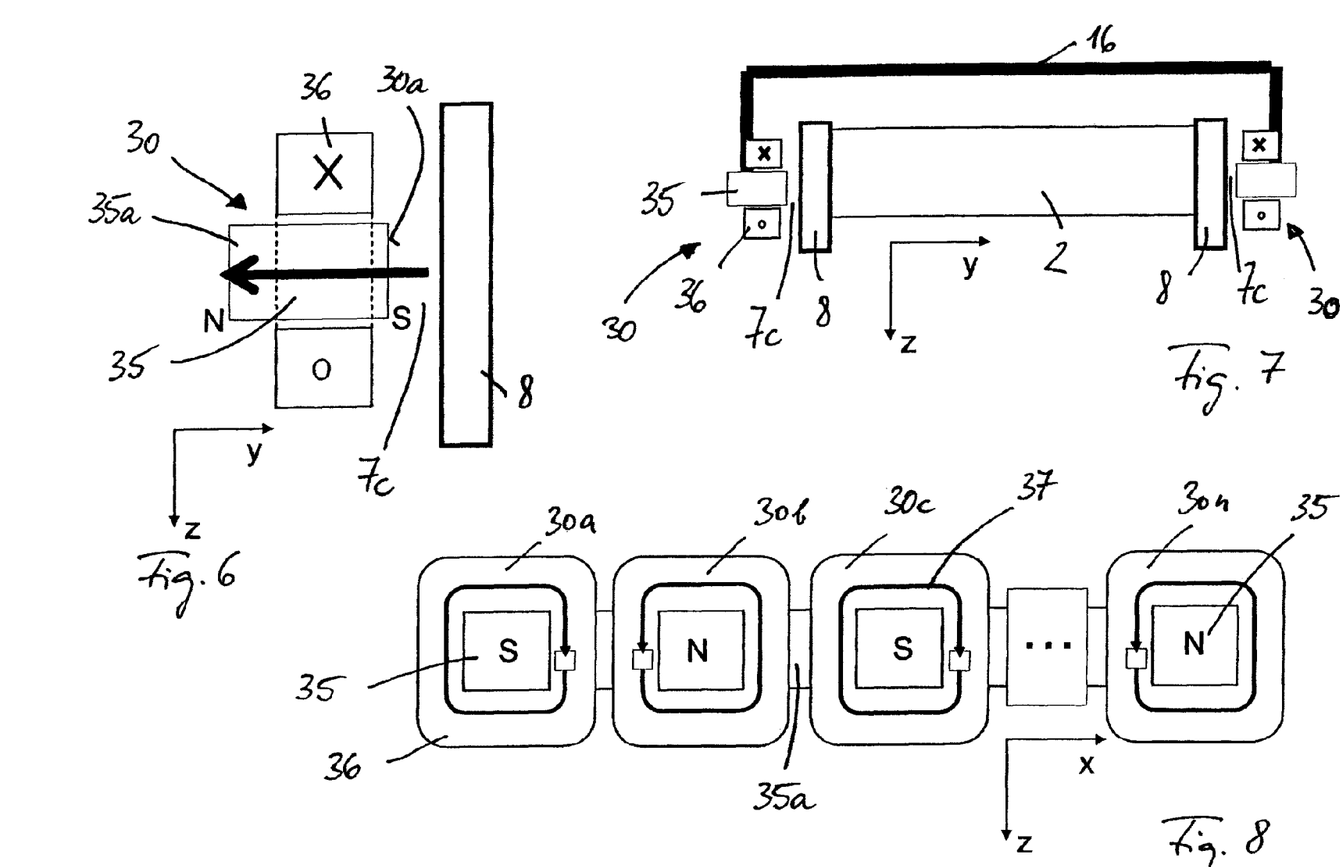
FIG. 6 is a schematic view showing the design of a prior-art eddy current braking magnet array in a view corresponding to FIG. 3.
FIG. 7 is a schematic view showing the design of a prior-art eddy current braking magnet array in a view corresponding to FIG. 4.
FIG. 8 is a schematic view showing the design of a prior-art eddy current braking magnet array in a view corresponding to FIG. 5.

The magnets used in the magnet arrays 27 through 30 for the "guiding" and "braking" functions are schematically shown as examples in FIGS. 3 through 5 and in FIGS. 6 through 8.

FIGS. 3 through 5 show at first the design of the guide magnet array 27, wherein the track support is designated by reference number 2, as in FIG. 1, the two reaction rails arranged at the longitudinal sides thereof by reference number 8, and the levitation frame by reference number 16. The systems of coordinates in FIGS. 3 through 5 indicate that, as usual, the x axis is defined by the direction of travel, the y axis by the direction at right angles to the direction of travel and the z axis by the height direction. Furthermore, it is seen especially in FIG. 4 that at least one guide magnet array 27 each fastened to the levitation frame is associated with each reaction rail 8.

Each guide magnet array 27 contains in the exemplary embodiment according to FIG. 5 a plurality of magnet poles 27a, 27b, 27c . . . 27n and 31a, 31b, 31c . . . 31n, which are located next to each other in the x direction and which are arranged in two rows extending in parallel to the x direction and are located one on top of another, wherein two magnet poles each arranged one on top of another (e.g., 27a, 31a) form a pair each and n denotes any desired integer. These magnet pole pairs 27a, 31a come into being due to the use of C-shaped cores 32, whose middle legs are arranged in parallel to the z axis and which are surrounded by windings 33, through which direct current flows during the operation of the magnetic levitation vehicle 1 such that north poles N (27a . . . 27n) are formed at the upper legs of the cores 32 and south poles S (31a . . . 31n) are formed at the lower legs of the cores 32. As is indicated especially in FIG. 5 by arrows 34, the direction of winding and the directions of current flow in the longitudinal direction or direction of travel of the magnetic levitation vehicle 1 are identical in all cores 32. The consequence of this is that the guide magnet arrays 27 through 29 (FIG. 2) exert essentially an attracting magnetic force (arrows F in FIG. 4) on the reaction rails 8, which are located opposite them and consist of a ferromagnetic material. In addition, it is ensured during the operation by means of gap sensors and regulating means, not shown, that the currents which are fed into the windings 33 on the right and left sides (FIG. 4) of the track support 2, generate a resulting force F=F left–F right, which centers the magnetic levitation vehicle 1 relative to the track support 2 or to the reaction rails 8 such that the gaps 7a do not exceed a preselected value. Due to the fact that the magnet poles 27a . . . 27n, 31a . . . 31n can be arranged in the direction of travel at closely spaced locations from one another, aside from small gaps caused by the windings 33 and consistently have the same polarity at the top and at the bottom (FIG. 5), it is achieved, moreover, that only weak eddy currents, which increase the running resistance only slightly are generated in the reaction rails 8.

The magnet arrays 28 and 29 (FIG. 2) are designed in exactly the same manner as the magnet array 27 described on the basis of FIGS. 3 through 5.

By contrast, FIGS. 6 through 8 show that even though the braking magnet arrays 30 (FIG. 2) likewise have a plurality of magnet poles 30a, 30b . . . 30n (FIG. 8) arranged next to each other in the direction of travel which are arranged, like the magnet poles 27a . . . 27n and 31a . . . 31n of the guide magnet arrays 27 through 29, on both sides of the levitation frame 16 and are located opposite the reaction rails 8, forming a gap 7c each (FIG. 7), the magnet poles 30a. . . 30n are formed, contrary to the guide magnet poles, e.g., by rod-shaped cores 35, whose axes extend at right angles to the reaction rails 8 and in parallel to the y axis. In addition, the cores 35 are surrounded by windings 36 with correspondingly extending axes and are connected on their rear sides to at least one magnet back 35. These windings 36 are currentless during normal operation. If emergency braking is necessary or application of the braking magnet array 30 is desirable for other reasons, direct currents are fed to the windings 36 in such a way that, e.g., a magnet pole 30a (FIG. 8) is a south pole S, a magnet pole 30b following it is a north pole N, the next magnet pole 30c is again a south pole S, etc., i.e., the magnet poles 30a . . . 30n following each other in the x direction are alternatingly north or south poles. The current directions necessary for this are schematically indicated by arrows 37 in FIG. 8.

Based on this alternating arrangement of north and south poles and the motion of the magnet poles 30a . . . 30n in the x direction relative to the reaction rails 8 consisting of massive and electrically conductive materials, alternating magnetic fields are generated when direct current is fed to the windings 36, and these alternating magnetic fields induce alternating electric fields and hence eddy currents in the reaction rails 8, which seek to inhibit the cause of their generation, namely, the motion of the magnet poles 30a . . . 30n and brake the magnetic levitation vehicle 1 as a result. The value of the braking force can be controlled by varying the intensity of the currents sent to the windings 36.

A magnetic levitation vehicle as well as guide and braking magnet arrays of the type described are known to the person skilled in the art from the documents DE 10 2004 056 438 A1 (corresponding to US2008257197) and DE 10 2004 013 994 A1 (corresponding to US2008257662), which are hereby made the subject of the present disclosure by reference for simplicity's sake. Further, US2008257197 and US2008257662 are hereby incorporated by reference).

A problem resulting from the arrays according to FIGS. 2 through 8 is that nonuniform introduction of forces into the levitation frame 16 (FIG. 1) is obtained. Yawing moments, which must be absorbed by the levitation frame 16 and the body 17 or the track 2 (FIG. 1), are generated as a result. A total of four load alternations, namely, one each at the two ends of the magnetic levitation vehicle 1 and another two in the area of the braking magnets 30, would result in a magnetic levitation vehicle 1 with a middle braking magnet 30 and, e.g., three guide magnets 27 through 29 each arranged in front of and behind it. This is undesirable especially in magnetic levitation vehicles 1 traveling at a high rate of speed because of the forces exerted thereby on the track 2.

Figure 9:
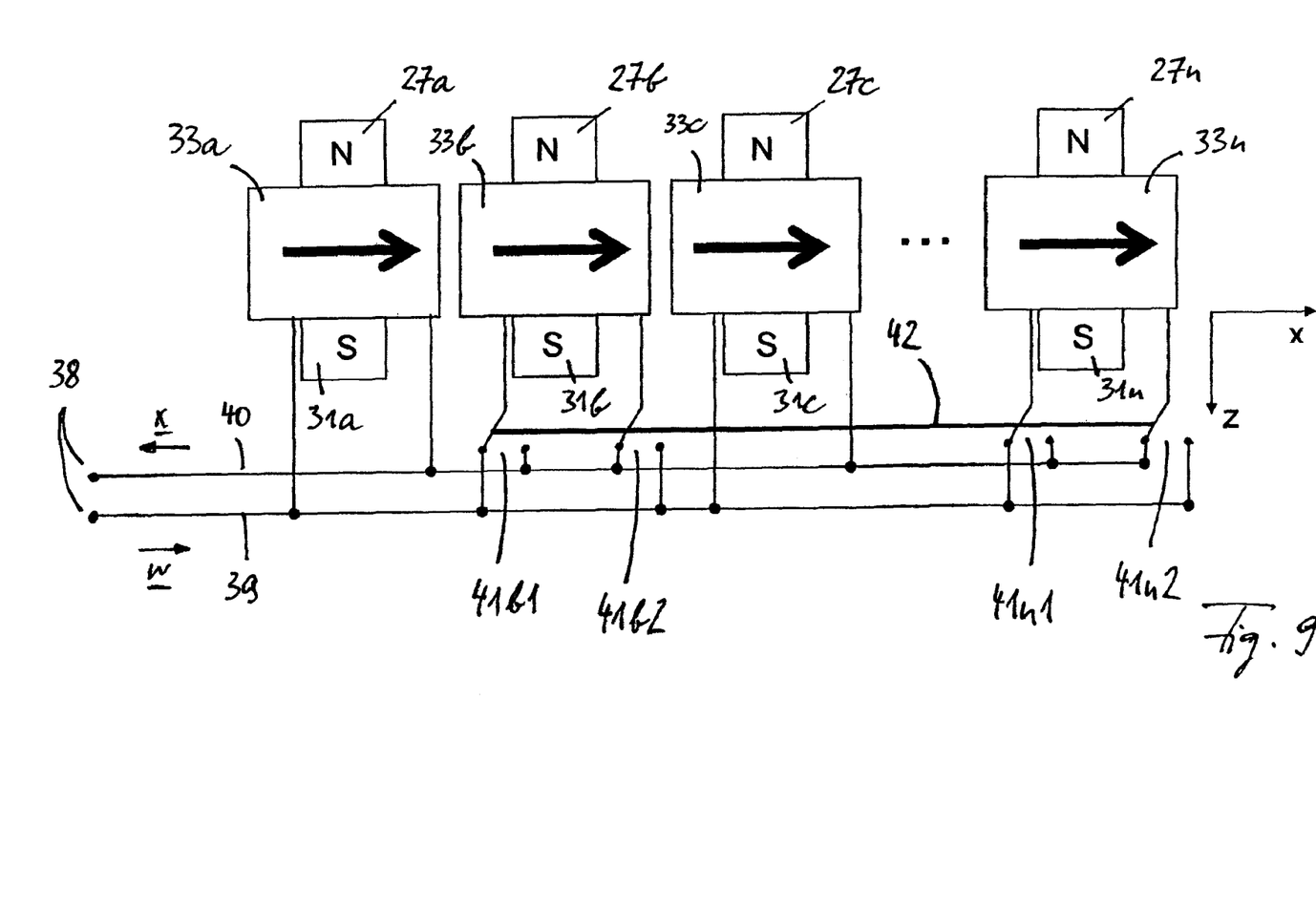
FIG. 9 is a schematic view showing a combined magnet array according to the present invention, which is set up for the "guiding" function.
Figure 10:
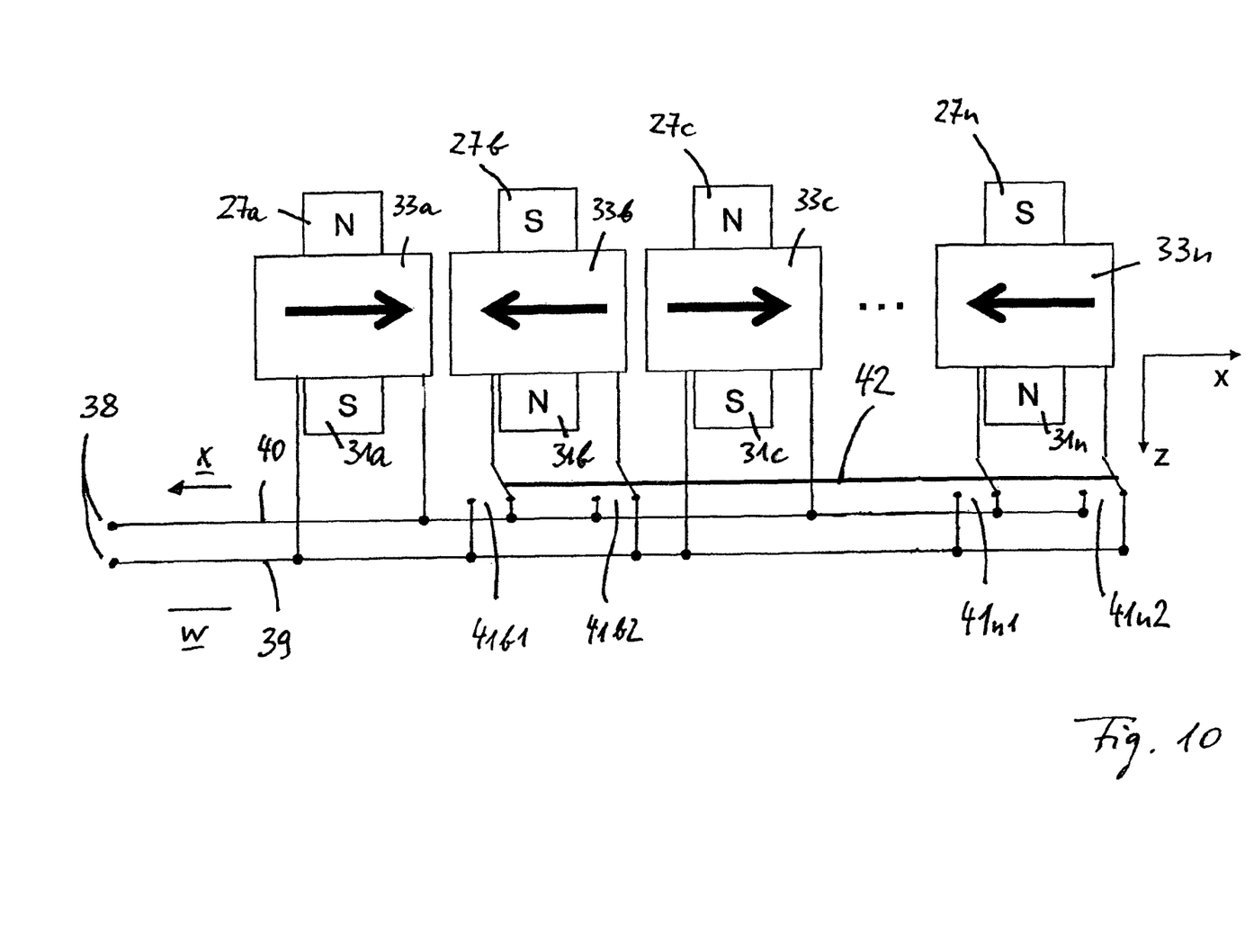
FIG. 10 is a schematic view showing a combined magnet array according to the present invention, which is set up for the "braking" function.

FIGS. 9 and 10 schematically show a magnet array according to the present invention, which is based on the magnet array shown in FIGS. 3 through 5, as is shown by a comparison of FIGS. 9 and 10 with FIG. 5. Identical parts are therefore designated by the same reference numbers as in FIGS. 3 through 5.

Contrary to FIGS. 3 through 5, not all windings 33 of the individual magnet poles 27a . . . 27n and 31a . . . 31n, where the letter n designates an integer and preferably also an even number, are connected directly to two schematically indicated outputs 38 of a control circuit. This is rather true to every other winding 33a, 33c . . . 33n-1 only, which are rigidly connected to a respective line 39 and 40 each connected to the corresponding output 38 of the controller, the arrows w and x in FIG. 9 schematically indicating the directions of the direct currents flowing in the lines 39, 40. It follows from this, assuming equal direction of winding, that the magnet poles 27a, 27c, etc., on the one hand, and the magnet poles 31a, 31c, etc., on the other hand, have all the same polarity (e.g., only north poles N at the top and only south poles S at the bottom).

By contrast, the inputs and outputs of the windings 33b, 33d . . . 33n—the winding 33d not shown being an imaginary winding following winding 33c—can be connected to the lines 39, 40 via mobile contacts of switches 41b1, 41b2 . . . 41n1, 41n2, and the mobile contacts of all switches 41 can be switched over, e.g., together, as this is schematically indicated by a slide 42. It is clear that the switches 41 in FIGS. 9 and 10 are shown as mechanically actuated switches for the sake of better understanding only, but they actually preferably consist of electronic switches.

The inputs of the windings 33b, 33d . . . 33n are connected to line 39 and the outputs of windings 33b . . . 33n are connected to line 39 in the positions of the switches 41 as shown in FIG. 9. If the same direction of winding is again assumed everywhere, the same polarities will develop as in the magnet poles 27a, 27c . . . 27n-1, where n is assumed to be an even integer, in the magnet poles 27b, 27d . . . 27n, where magnet pole 27d is an imaginary magnet pole not shown in the drawing, which follows magnet pole 27c. In this state, the magnet array according to FIG. 9 exactly corresponds to that according to FIG. 5, i.e., all north poles N are at the top and all south poles S are at the bottom, even though it could, of course, also be the other way around. The magnet array according to FIG. 9 can therefore be used in FIG. 2 as a guide magnet array 27, 28 and 29.

FIG. 10 shows the same magnet array, but in another position of the switches 41b1, 41b2 . . . 41n1, 41n2. The switches 41 are set now by actuating the schematically shown slide 42 such that the inputs of the windings 33b, 33d . . . 33a are connected to line 40 and the outputs of the windings 33b, 33d . . . 33n are connected to line 39. Since the direction of winding has not changed, the consequence of this is that the upper magnet poles 27b, 27d . . . 27n are south poles S now and the corresponding magnet poles 31b, . . . 31n in located at the bottom are north poles N. North and south poles are therefore alternatingly present in both the upper and lower rows of the magnet poles, as this is also shown in FIG. 8 for one row of magnet poles only. The magnet array according to FIG. 10 is therefore suitable now for use as a braking magnet array 30 in FIG. 2, because both rows of magnet poles form alternating magnetic fields during a motion of the magnet poles relative to the reaction rails 8 and can generate braking eddy currents in the reaction rails 8.

Thus, the same magnet array (FIGS. 3 through 5) can be used according to the present invention both as a guide magnet (FIG. 9) and as a braking magnet (FIG. 10), depending on whether the switches 41 assume the positions according to FIG. 9 or according to FIG. 10. The magnetic levitation vehicle according to the present invention is therefore equipped, preferably on both sides of the track support 2, with at least one magnet array each, e.g., one according to FIGS. 3 through 5, and these two magnet arrays are preferably of the same design and are arranged mirror symmetrically in relation to a vehicle central plane 43 extending in parallel to the direction of travel (FIG. 4). The individual windings 33 of this magnet array are connected via switching arrangements according to FIGS. 9 and 10 to suitable power sources in order to set the guiding and/or braking function as desired by means of the switches 41.

Figure 11:
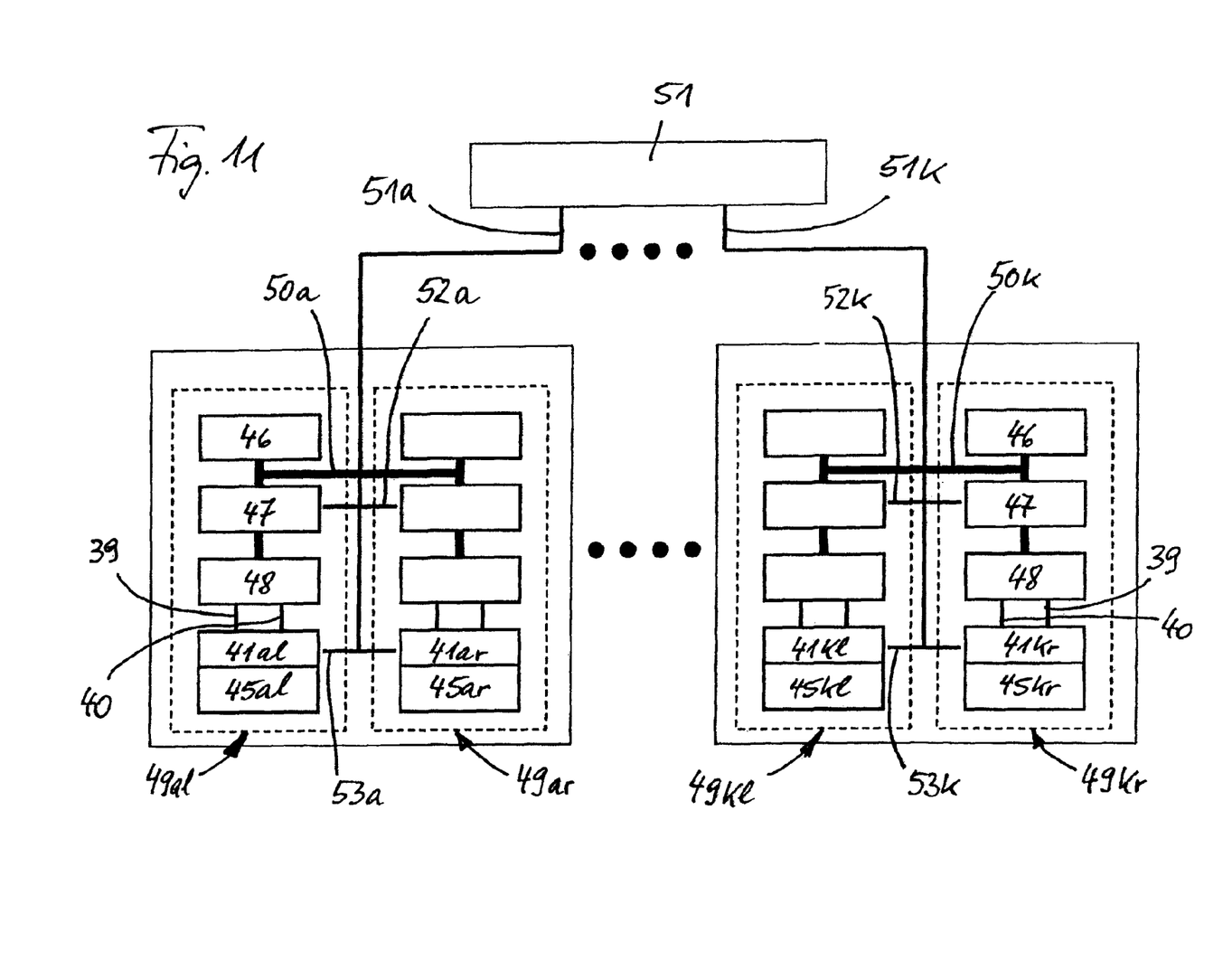
FIG. 11 is a block diagram for operating the magnet array according to FIGS. 9 and 10.

FIG. 11 shows a schematic block diagram, which shows the control of the magnet arrays according to FIGS. 9 and 10. It is assumed here that magnet arrays 45al (l=left) and 45ar (r=right) through 45kl and 45kr of the same type, where k may be any integer, are present on each side of a vehicle 1 or of a vehicle section (FIG. 2). Each magnet array is supplied with current corresponding to FIGS. 9 and 10 via lines 39 and 40 and the corresponding switches 41al, 41ar, etc. This current is supplied in the known manner by control circuits, which have gap sensors 46 for measuring the guide gap 7a (FIG. 1) and controllers 47 connected to same as well as current adjusters 48, which form, together with the switches 41 and magnet arrays 45, a magnet system 49al, 49ar, etc., each, boxed by a broken line. Lines 50a . . . 50k indicate in FIG. 6 that the regulation takes place in each pair of magnet systems 49al, 49ar and 49kl, 49kr belonging to each other such that equal guide gaps 7a are formed on both sides of the vehicle.

The switches 41 are in the positions according to FIG. 9 in the normal case, so that the regulators 47 ensure the usual gap regulation. If, by contrast, it is necessary to initiate a braking operation, the braking controller 51 shown schematically in FIG. 6 is activated for this, which has k outputs 51a through 51k, which are connected to a pair of the magnet systems 49al, 49ar through 49kl, 49kr each. In addition, it is indicated with the lines 52 and 53 that the braking controller 51 can act on the regulator 47, on the one hand, and on the switches 41al, 41ar, etc., on the other hand.

In case of braking, the braking controller 51 ensures, on the one hand, via line 53 that the switches 41al, 41ar, etc., are switched over into the positions according to FIG. 10. On the other hand, signals are sent to the regulators 47 in case of braking such that currents as are needed for braking are imposed on the two magnet arrays of one pair (e.g., the magnet arrays 45al, 45ar). These currents are preferably equal for both magnet arrays of the pair in order to ensure that the difference of the two currents needed for the guiding function remains equal on the left and right sides.

The braking controller 51 is deactivated after end the braking operation, so that the switches 41 return into the positions according to FIG. 9 and the magnet arrays 45al, 45ar, etc., will again operate as before the onset of the braking maneuver.

The magnet array described offers numerous advantages. First, the currents fed into the windings 33 in case of the guiding function may have current intensities different from those in case of the braking function. While comparatively weak currents suffice for the guiding function, stronger currents and also different current values are, in general, needed for the braking function, depending on the particular velocity of the vehicle. Furthermore, the present invention makes it possible, if necessary, to maintain the guiding function even in case of braking. Since it is necessary for the guiding function to select the currents, e.g., on the right and left sides of the vehicle such that the vehicle is held permanently in the track, only a braking current, which is equal on both sides, needs to be imposed on these currents in case of braking in order to also bring about the braking function without any change in the guiding function.

A special advantage of the array described is, furthermore, that the order of the magnet poles along the entire magnetic levitation vehicle 1 can be selected such as can be seen in FIGS. 9 and 10, i.e., it is not necessary for different magnet arrays to alternate. If only the guiding function is necessary in this case, which corresponds to the usual case, no disturbing load alternations are obtained any longer over the entire length of the vehicle with the exception of the two ends, especially if the magnet poles 27a . . . 27n, 31a . . . 31n in are arranged continuously or possibly continuously. Furthermore, more magnet poles are available for the braking function than before, as it is shown by a comparison of FIGS. 2 and 10. Furthermore, it is advantageous that redundancy is greater than before both during the setting of the guiding function and during the setting of the braking function, because more magnet poles can be used for both functions than before. Finally, another advantage is that the braking function can be set with a selectable number of magnet poles. This is possible, for example, due to the fact that the switching arrangement is designed such that the switches 41 do not have to be actuated with the same slide 42 or simultaneously, but can be switched over one by one or group by group. The braking force can thus be adapted to the conditions necessary in the particular case extensively as desired by means of the current intensity and/or by means of the number of magnet poles selected.

The present invention is not limited to the exemplary embodiment described, which can be varied in many different ways. This applies, in particular, to the design embodiment of the magnet poles 27a . . . 27n, 31a . . . 31n. It would be conceivable, e.g., to use cores 32 of a shape different from the C shape according to FIG. 3, for example, an E shape. The switching arrangement according to FIGS. 9 and 10 may also have a different design, especially because this depends essentially on the number of magnet pole rows present and the possibilities of selecting the braking magnet poles. Furthermore, it is clear that a magnetic levitation vehicle 1 may have, on each side, a plurality of magnet arrays arranged one after another in the direction of travel according to FIGS. 9 and 10, whose windings are connected one by one or group by group to different regulators. Furthermore, constructions in which the reaction rails 8 are not arranged on the sides but in a middle part of the track support 2 are conceivable, in which case a single reaction rail would also be sufficient. Finally, it is obvious that the different features may also be used in combinations other than those described and shown.

While specific embodiments of the invention have been described in detail to illustrate the application of the principles of the invention, it will be understood that the invention may be embodied otherwise without departing from such principles.

The invention claimed is:

1. A magnetic levitation vehicle, comprising:
a first magnet array with carrier magnets that act as exciting magnets at the same time;
a second magnet array with a plurality of magnet poles arranged one after another in a direction of travel with windings associated with said poles; and
a switching arrangement connected to the windings for supplying said windings with direct current, said switching arrangement containing switches connected to the windings for setting the second magnet array to a guiding function and/or a braking function as desired, by changing the polarity of some of the magnet poles of the second magnet array.

2. A magnetic vehicle in accordance with claim 1, wherein all magnet poles of the second magnet array are provided continuously with the same polarity in the direction of travel when the switching arrangement is set to the guiding function and some of the magnet poles are provided with opposite polarities in the direction of travel when the switching arrangement is set to the braking function.

3. A magnetic vehicle in accordance with claim 2, wherein the magnet poles are arranged continuously one after another in the direction of travel.

4. A magnetic vehicle in accordance with claim 1, wherein the second magnet array has at least two rows of magnet poles arranged one on top of another and in parallel to one another in the direction of travel, wherein two magnet poles located one on top of another each form one pair, and that the two magnet poles of each pair are operated with opposite polarity.

5. A magnetic vehicle in accordance with claim 4, wherein all magnet poles in a first of the two rows are operated continuously with the same polarity and all magnet poles in a second of the two rows are likewise operated continuously with the same polarity opposite that of the first rows in case of setting for the guiding function.

6. A magnetic vehicle in accordance with claim 4, wherein both the magnet poles in a first of the two rows and the magnet poles in a second of the two rows are operated at least partially with alternatingly opposite polarities in the direction of travel in case of setting the braking function.

7. A magnetic vehicle in accordance with claim 1, wherein with second magnet array is arranged in parallel on both sides of the vehicle to provide two second magnet arrays, the two second magnet arrays are of identical design and are arranged mirror symmetrically in relation to a central plane of the vehicle extending in parallel to the direction of travel.

8. A magnetic vehicle in accordance with claim 7, wherein the guiding function is maintained when the braking function is set.

9. A magnetic vehicle in accordance with claim 1, wherein the braking force is provided by switching a preselected number of magnet poles when the braking function is set.

10. A magnetic vehicle in accordance with claim 1, wherein the braking force takes place by means of the electric current fed into the windings of the magnet poles when the braking function is set.

11. A magnetic levitation vehicle in accordance with claim 1, wherein the braking force takes place by means of the electric current fed into the windings of the magnet poles when braking.

12. A magnetic levitation vehicle comprising:
a carrier magnet array with carrier magnets for carrying the vehicle to maintain a levitation gap by attractive magnetic forces and acting as exciting magnets at the same time for driving the vehicle and braking the vehicle;
a guiding magnet array with electro magnets including a plurality of magnet poles arranged one after another in a direction of travel and windings associated with each of said magnet poles; and
a switching arrangement connected to the windings for supplying said windings with direct current, said switching arrangement including switches connected to said windings and acting on selected windings for switching at least some of said magnets of said array between guiding and braking by changing the polarity of some of the magnet poles of the second magnet array such that some of said magnets are of one polarity and some of said magnets are of an opposite polarity.

13. A magnetic levitation vehicle in accordance with claim 12, wherein all of said magnet poles are provided with a same polarity as an adjacent magnet pole in a direction of travel for said guiding and said switching arrangement switches a plurality of said some of said magnet poles to opposite polarities relative to an adjacent magnet pole in the direction of travel for said braking.

14. A magnetic levitation vehicle in accordance with claim 13, wherein the magnet poles are arranged continuously one after another in the direction of travel.

15. A magnetic levitation vehicle in accordance with claim 14, wherein the guiding magnet array has at least two rows of magnet poles arranged one above another and in parallel to one another in the direction of travel, wherein two magnet poles located one on top of another each form one pair, and that the two magnet poles of each pair are operated with opposite polarity.

16. A magnetic levitation vehicle in accordance with claim 15, wherein all magnet poles in a first of the two rows are operated continuously with the same polarity and all magnet poles in a second of the two rows are likewise operated continuously with the same polarity opposite that of the first rows for guiding.

17. A magnetic levitation vehicle in accordance with claim 15, wherein both the magnet poles in a first of the two rows and the magnet poles and in a second of the two rows are operated at least partially with alternatingly opposite polarities in the direction of travel for braking.

18. A magnetic levitation vehicle in accordance with claim 12, wherein said guiding magnet array is at one side of the vehicle and another guiding magnet array with electro magnets including a plurality of magnet poles arranged one after another in a direction of travel and windings associated with each of said magnet poles is arranged at an opposite side of the vehicle to provide the arrays arranged in parallel on both sides of the vehicle, wherein the magnet arrays are of identical design and are arranged mirror symmetrically in relation to a central plane of the vehicle extending in parallel to the direction of travel.

19. A magnetic levitation vehicle in accordance with claim 18, wherein the guiding function is continued at some of said magnet poles when braking function is set at other of said magnet poles.

20. A magnetic levitation vehicle in accordance with claim 12, wherein the braking force takes place by means of a preselected number of magnet poles when braking.

* * * * *